(12) United States Patent
Madsen (10) Patent No.: US 9,308,709 B2
(45) Date of Patent: Apr. 12, 2016

(54) BONDING APPARATUS AND METHOD

(71) Applicant: Fenwal, Inc., Lake Zurich, IL (US)

(72) Inventor: James Madsen, Kildeer, IL (US)

(73) Assignee: Fenwal, Inc., Lake Zurich, IL (US)

( * ) Notice: Subject to any disclaimer, the term of this patent is extended or adjusted under 35 U.S.C. 154(b) by 131 days.

(21) Appl. No.: 13/911,560

(22) Filed: Jun. 6, 2013

(65) Prior Publication Data

US 2014/0360668 A1 Dec. 11, 2014

(51) Int. Cl.
*B29C 65/20* (2006.01)
*B32B 37/00* (2006.01)
(Continued)

(52) U.S. Cl.
CPC ............. *B32B 37/0046* (2013.01); *B29C 65/02* (2013.01); *B29C 65/7802* (2013.01); *B29C 65/7841* (2013.01); *B29C 66/112* (2013.01); *B29C 66/114* (2013.01); *B29C 66/24221* (2013.01); *B29C 66/53461* (2013.01); *B29C 66/723* (2013.01); *B29C 66/7392* (2013.01); *B29C 66/8169* (2013.01); *B29C 66/8223* (2013.01); *B29C 66/8322* (2013.01); *B32B 37/04* (2013.01); *B29C 65/18* (2013.01); *B29C 66/71* (2013.01); *B29C 66/72321* (2013.01); *B29C 66/7352* (2013.01); *B29C 66/73115* (2013.01); *B29C 66/73921* (2013.01); *B29C 66/8242* (2013.01); *B29C 66/847* (2013.01); *B29C 66/919* (2013.01); *B29C 66/91421* (2013.01); *B29C 66/91431* (2013.01); *B29C 66/91921* (2013.01); *B29C 66/929* (2013.01); *B29C 66/9241* (2013.01); *B29C 66/92611* (2013.01); *B29C 66/944* (2013.01); *B29C 66/949* (2013.01); *B29L 2031/753* (2013.01); *B32B 2307/732* (2013.01); *B32B 2310/0806* (2013.01);
(Continued)

(58) Field of Classification Search
CPC ...... B29C 65/18; B29C 65/20; B65B 7/2878; B30B 15/14; B30B 15/16; B30B 15/26; B30B 9/047
USPC ................ 100/54–64; 156/69, 583.1–583.91; 53/478, 485, 488
See application file for complete search history.

(56) References Cited

U.S. PATENT DOCUMENTS 3,853,478 A * 12/1974 Rodgers ........................ 422/119
3,863,826 A 2/1975 Shoh
(Continued)

FOREIGN PATENT DOCUMENTS

EP 0194873 B1 7/1991
EP 0507321 B1 10/1992
(Continued)

OTHER PUBLICATIONS

U.S. Appl. No. 14/110,010, filed Oct. 4, 2013, entitled Fluid Flow Conduits and Apparatus and Methods for Making a Joining Fluid Conduits.

(Continued)

*Primary Examiner* — Scott W Dodds
(74) *Attorney, Agent, or Firm* — Cook Alex Ltd.

(57) ABSTRACT

Apparatus and method are disclosed for heat bonding or welding a thermoplastic component to a sealing member such as a film or foil having a thermoplastic portion. The apparatus preferably includes a 3-axis arrangement for accurate and repeatable positioning of the component and foil during bonding and for variation of bonding parameters, such as material, pressure, temperature and/or time.

13 Claims, 3 Drawing Sheets

(51) Int. Cl.
    *B29C 65/78* (2006.01)
    *B29C 65/00* (2006.01)
    *B29C 65/02* (2006.01)
    *B32B 37/04* (2006.01)
    *B29L 31/00* (2006.01)
    *B29C 65/18* (2006.01)

(52) U.S. Cl.
    CPC ......... *B32B 2386/00* (2013.01); *B32B 2535/00* (2013.01); *Y10T 156/1744* (2015.01)

(56) References Cited

U.S. PATENT DOCUMENTS

| | | | |
|---|---|---|---|
| 3,968,195 A | 7/1976 | Bishop | |
| 4,030,494 A | 6/1977 | Tenczar | |
| 4,157,723 A | 6/1979 | Granzow et al. | |
| 4,369,779 A | 1/1983 | Spencer | |
| 4,412,835 A | 11/1983 | Spencer | |
| 4,443,215 A | 4/1984 | Smith | |
| 4,510,014 A * | 4/1985 | Artusi et al. | 156/522 |
| RE32,056 E | 12/1985 | Granzow et al. | |
| 4,619,642 A | 10/1986 | Spencer | |
| 4,673,400 A | 6/1987 | Martin | |
| 4,737,214 A | 4/1988 | Leurink et al. | |
| 4,753,697 A | 6/1988 | Shaposka et al. | |
| 4,770,735 A | 9/1988 | Shaposka et al. | |
| 4,793,880 A | 12/1988 | Shaposka et al. | |
| 4,828,557 A | 5/1989 | Persidsky | |
| 4,832,773 A | 5/1989 | Shaposka et al. | |
| 4,864,101 A | 9/1989 | Shaposka et al. | |
| 4,897,138 A | 1/1990 | Shaposka et al. | |
| 4,913,756 A | 4/1990 | Shaposka et al. | |
| 4,933,036 A | 6/1990 | Shaposka et al. | |
| 5,009,645 A | 4/1991 | Silver et al. | |
| 5,045,666 A * | 9/1991 | Kent | 219/85.22 |
| 5,141,592 A | 8/1992 | Shaposka et al. | |
| 5,156,701 A | 10/1992 | Spencer et al. | |
| 5,158,630 A | 10/1992 | Shaposka et al. | |
| 5,182,440 A | 1/1993 | Dufour et al. | |
| 5,209,800 A | 5/1993 | Spencer et al. | |
| 5,244,522 A | 9/1993 | Spencer et al. | |
| 5,245,693 A * | 9/1993 | Ford et al. | 392/470 |
| 5,248,359 A | 9/1993 | Shaposka et al. | |
| 5,256,229 A | 10/1993 | Spencer | |
| 5,256,845 A | 10/1993 | Schippers | |
| 5,272,304 A | 12/1993 | Been et al. | |
| 5,279,685 A | 1/1994 | Ivansons et al. | |
| 5,342,345 A | 8/1994 | Spencer | |
| D355,848 S | 2/1995 | Ivansons et al. | |
| 5,397,425 A | 3/1995 | Ivansons et al. | |
| D357,926 S | 5/1995 | Ivansons et al. | |
| 5,518,575 A | 5/1996 | Watanabe | |
| 5,525,186 A | 6/1996 | Ivansons et al. | |
| 5,632,852 A | 5/1997 | Ivansons et al. | |
| 5,674,333 A | 10/1997 | Spencer | |
| 5,733,268 A | 3/1998 | Spencer | |
| 5,802,689 A | 9/1998 | Sano | |
| 5,855,731 A | 1/1999 | Spencer | |
| 5,858,016 A | 1/1999 | Bacehowski et al. | |
| 5,871,612 A | 2/1999 | Spencer | |
| 5,919,173 A | 7/1999 | Spencer | |
| 5,928,216 A | 7/1999 | Spencer | |
| 6,020,574 A | 2/2000 | Ivansons | |
| 6,026,882 A | 2/2000 | Yamada et al. | |
| 6,071,690 A | 6/2000 | Spencer | |
| 6,132,833 A | 10/2000 | Spencer | |
| 6,177,652 B1 | 1/2001 | Ivansons | |
| 6,258,449 B1 * | 7/2001 | Nagasawa et al. | 428/209 |
| 6,341,637 B1 | 1/2002 | Yamada et al. | |
| 6,348,049 B1 | 2/2002 | Spencer | |
| 6,416,489 B1 | 7/2002 | Booth | |
| 6,460,592 B1 | 10/2002 | Sano et al. | |
| 6,463,979 B1 | 10/2002 | Sano et al. | |
| 6,485,593 B1 | 11/2002 | Christoffersen | |
| 6,596,122 B1 | 7/2003 | Savitski et al. | |
| 6,637,489 B1 | 10/2003 | Spencer | |
| 6,705,372 B2 | 3/2004 | Sano et al. | |
| 6,982,051 B2 | 1/2006 | St. Onge et al. | |
| 6,998,560 B2 | 2/2006 | Ananthanarayanan et al. | |
| 7,119,305 B2 | 10/2006 | Sano et al. | |
| 7,122,094 B2 | 10/2006 | Baradon et al. | |
| 7,223,262 B2 | 5/2007 | Brehm et al. | |
| 7,371,305 B2 | 5/2008 | Sano et al. | |
| 7,398,813 B2 | 7/2008 | Ivansons et al. | |
| 7,484,529 B2 | 2/2009 | Yokota et al. | |
| 7,657,996 B2 | 2/2010 | Sano et al. | |
| 7,722,733 B2 | 5/2010 | Tomasetti et al. | |
| 7,779,880 B2 | 8/2010 | Sano et al. | |
| 7,828,788 B2 | 11/2010 | Brehm et al. | |
| 7,938,454 B2 | 5/2011 | Buchanan et al. | |
| 7,964,048 B2 | 6/2011 | Hlavinka et al. | |
| 8,146,642 B2 | 4/2012 | Landherr et al. | |
| 8,162,021 B2 | 4/2012 | Tomasetti et al. | |
| 8,448,992 B2 | 5/2013 | Min et al. | |
| 2002/0174956 A1 | 11/2002 | Sano et al. | |
| 2003/0097824 A1 * | 5/2003 | Mayer et al. | 53/478 |
| 2005/0217211 A1 * | 10/2005 | Py | 53/426 |
| 2006/0005371 A1 | 1/2006 | Sano et al. | |
| 2006/0054275 A1 | 3/2006 | Sano et al. | |
| 2006/0054613 A1 | 3/2006 | Sano et al. | |
| 2006/0144525 A1 | 7/2006 | Sano et al. | |
| 2007/0142960 A1 | 6/2007 | Bolinger et al. | |
| 2007/0225673 A1 | 9/2007 | Brehm et al. | |
| 2008/0009833 A1 | 1/2008 | Corbin et al. | |
| 2008/0163481 A1 * | 7/2008 | Shida et al. | 29/740 |
| 2010/0137826 A1 | 6/2010 | Watts et al. | |
| 2014/0034230 A1 | 2/2014 | Wegener et al. | |
| 2014/0077488 A1 | 3/2014 | Wegener et al. | |

FOREIGN PATENT DOCUMENTS

| | | |
|---|---|---|
| EP | 0723851 A2 | 7/1996 |
| EP | 0731540 B1 | 10/2004 |
| JP | S5743824 A | 3/1982 |
| JP | 61290035 | 12/1986 |
| JP | 09150458 | 6/1997 |
| WO | WO 8202528 A1 | 8/1982 |
| WO | WO 2008131442 A2 | 10/2008 |
| WO | WO 2012/022635 A2 | 2/2012 |
| WO | WO 2012110895 A1 | 8/2012 |
| WO | WO 2013096038 A1 | 6/2013 |

OTHER PUBLICATIONS

Notification of Transmittal of the International Search Report, International Search Report and Written Opinion for PCT/IB2012/000387 dated Jun. 13, 2012.

Written Opinion of the International Preliminary Examining Authority for PCT/IB2012/000387 dated Jan. 14, 2013.

Demand for Chapter II Preliminary Examination, Response to Written Opinion and Amendments Under PCT Article 34 and Transmittal Thereof for PCT/IB2012/000387 filed Oct. 25, 2012.

Response to Written Opinion of the International Preliminary Examining Authority Mailed Jan. 14, 2013 for PCT/IB2012/000387 filed Feb. 13, 2013.

Notification of Transmittal of the International Search Report, International Search Report and Written Opinion for PCT/US2011/069103 dated Feb. 28, 2013.

Extended European Search Report for EP 2810766 A1 (Application No. EP 13190376.7) dated Nov. 6, 2014.

* cited by examiner

BONDING APPARATUS AND METHOD

The present subject matter relates to apparatus and methods for bonding thermoplastic parts or pieces together and, more particularly, to apparatus and method for melt bonding or welding such parts or pieces to form a hermetic seal therebetween for use, for example, as a component of a sterile connection system.

BACKGROUND ART

Fluid flow systems or assemblies that are pre-sterilized and/or pre-assembled are used in a wide variety of medical and non-medical applications. Medical applications may include, for example, administration of medical fluids to a patient for therapeutic and/or diagnostic purposes, blood and/or blood component or other cell collection or processing, dialysis and other medical procedures. Non-medical applications for such systems or assemblies may include, for example, pharmaceutical or medical device manufacturing and/or cell processing. In the medical field in particular, fluid flow systems or assemblies commonly employ one or more pre-filled containers or other sources of medical fluid or agent and an associated fluid flow circuit or system (sometimes called a tubing set) containing the necessary flow tubing, valves, flow controllers, process chambers and the like to carry out the particular procedure, either alone or in cooperation with a reusable controller or other device. It is not unusual, for example, for a medical fluid flow system to include or be used in association with a container of a suitable drug, saline, anticoagulant, dextrose solution, sterile water, cell preservative or the like, to name just a few examples.

Such a fluid flow system can, however, pose manufacturing or assembly challenges for different reasons. One reason can be that the pre-filled containers of medical liquid, powder or other agent that is administered to the patient or otherwise employed in the medical fluid flow system, require different sterilization techniques than other portions of the fluid flow system. For example, empty plastic tubing, containers, flow control devices and/or processing devices or chambers, which do not contain any substantial amount of liquid or other agent, may be sterilized with gamma or electron beam (e-beam) radiation or by exposure to a sterilizing gas, e.g., ethylene oxide. However, gas sterilization would be ineffective to sterilize an agent, such as a liquid, powder or drug, contained in a sealed container, and exposing the agent to ionizing radiation may degrade or otherwise have a deleterious effect on the agent. Also, there may be situations where different portions of a sterile fluid flow system, even though suitable for the same sterilization process, are separately manufactured and sterilized for other reasons and then subsequently assembled in a sterile manner.

In addition sterile connections often need to be made on site, by the end user, e.g., at the location where the fluid flow systems are being used to treat patients or collect or process blood, or blood components, or biologic materials, or in other therapeutic or diagnostic procedures. For example, it may be desired to join a fluid source, filters, tubing or the like to other apparatus without comprising the sterility of any pre-sterilized components or parts of the assembly.

As a result of these various needs, a number of different approaches have been used in assembling sterile fluid flow systems or making sterile connections. One recent development in sterile connection systems and methods is described in U.S. Provisional Patent Application Ser. Nos. 61/578,690, filed Dec. 21, 2011; 61/585,467, filed Jan. 11, 2012; and 61/617,745, filed Mar. 30, 2012; and in PCT international application no. PCT/US2012/069103 filed Dec. 12, 2012, each of which is hereby incorporated by reference in its entirety. One example of a fluid flow circuit or subassembly employing a sterile connection system described in these applications includes a fluid conduit including at least one open end terminating in a heat meltable end material (e.g., a thermoplastic material) and a sealing member sealing the open end of the conduit. The sealing member includes at least one heating element configured to melt the end material upon energizing. Upon heating, the sealing member and open end of the conduit are relatively movable to expose the molten end material. Two such fluid flow circuits or subassemblies may be joined in a sterile manner to form a fluid flow circuit assembly by simultaneously melting the thermoplastic material of the open ends (by heating the heating element), relatively moving the sealing members and the respective open ends to which they are sealed to expose the open ends, and bringing the exposed open ends together while melted to form a junction between the fluid flow circuits that allows fluid flow therebetween.

Various thermoplastic materials have been identified for use in the above development, including polypropylene. Polypropylene, however, does not bond as well as desired to polyvinylchloride, which is a common material in fluid flow circuits. Accordingly, alternate materials and sealing and bonding conditions still need investigation and characterization.

SUMMARY

The following summary is intended to provide a general introduction to acquaint the reader broadly with the subject matter disclosed, and is not intended to set forth every feature, step, combination or sub-combination of the present subject matter, which is set forth below in the more detailed description, drawings and claims. The present subject matter has particular utility with respect to the recent sterile connection development described above, and is directed, in part, to apparatus and method for joining a component, for example a terminating member or component of a fluid flow conduit having at least a thermoplastic end portion, with a sealing member such as a laminated film or foil. The apparatus and method described herein may be used to join such members in connection with the manufacture of the fluid flow conduits or subassemblies described above and/or in connection with the developing, testing or evaluating of such joined members for purposes of research and development, such as characterizing or evaluating materials, bonding conditions (e.g., time, temperature, pressure) and/or bond strength. The apparatus and method preferably, but not necessarily, allow variation or change in certain sealing parameters such as temperature, time and/or pressure, as well as variation in dimensions and/or materials, which may be of particular advantage in connection with further research and development activities.

In one aspect, the present subject matter includes apparatus for bonding a thermoplastic portion of a member (e.g., a fluid system component) to a sealing member, such as a film or foil having a surface heat or melt weldable to the member portion. The apparatus may include a first fixture for holding the member and a second fixture for holding the foil. The apparatus also preferably includes a first drive for moving at least one of the fixtures in a first direction between a position wherein the fixtures are spaced sufficiently to allow loading of the member and foil in loaded but unbonded relationship in the respective fixtures, and a bonding position wherein the fixtures are more closely spaced to hold the member and foil in contacting/bonding relationship; a second drive for moving at least one of the fixtures in a second direction lateral to the first direction, and a third drive for moving at least one of the fixtures in a third direction generally lateral to the first and second directions. The apparatus may include an optional heat source for heating the foil.

In another aspect, a method is provided for bonding a thermoplastic portion of a member or component to a sealing member, such as a film or foil having a surface heat weldable to the member portion. Such method may include mounting such a member on a first fixture and mounting the foil on a second fixture, with the fixtures being relatively movable in three directions, a first direction of movement toward and away from one another, a second direction generally lateral to the first direction and a third direction generally lateral to the first and second directions. The method may further include heating the foil and moving at least one of the fixtures in the first, second and/or third directions between a loading position wherein the fixtures are spaced sufficiently to hold a member and foil in a loaded, unbonded relationship and a bonding position wherein the fixtures are more closely spaced to hold a member and foil in contacting relationship until the thermoplastic member portion and foil surface are bonded together, preferably forming a hermetic seal therebetween. Turning now to a more detailed description.

DETAILED DESCRIPTION

Figures 1, 2:
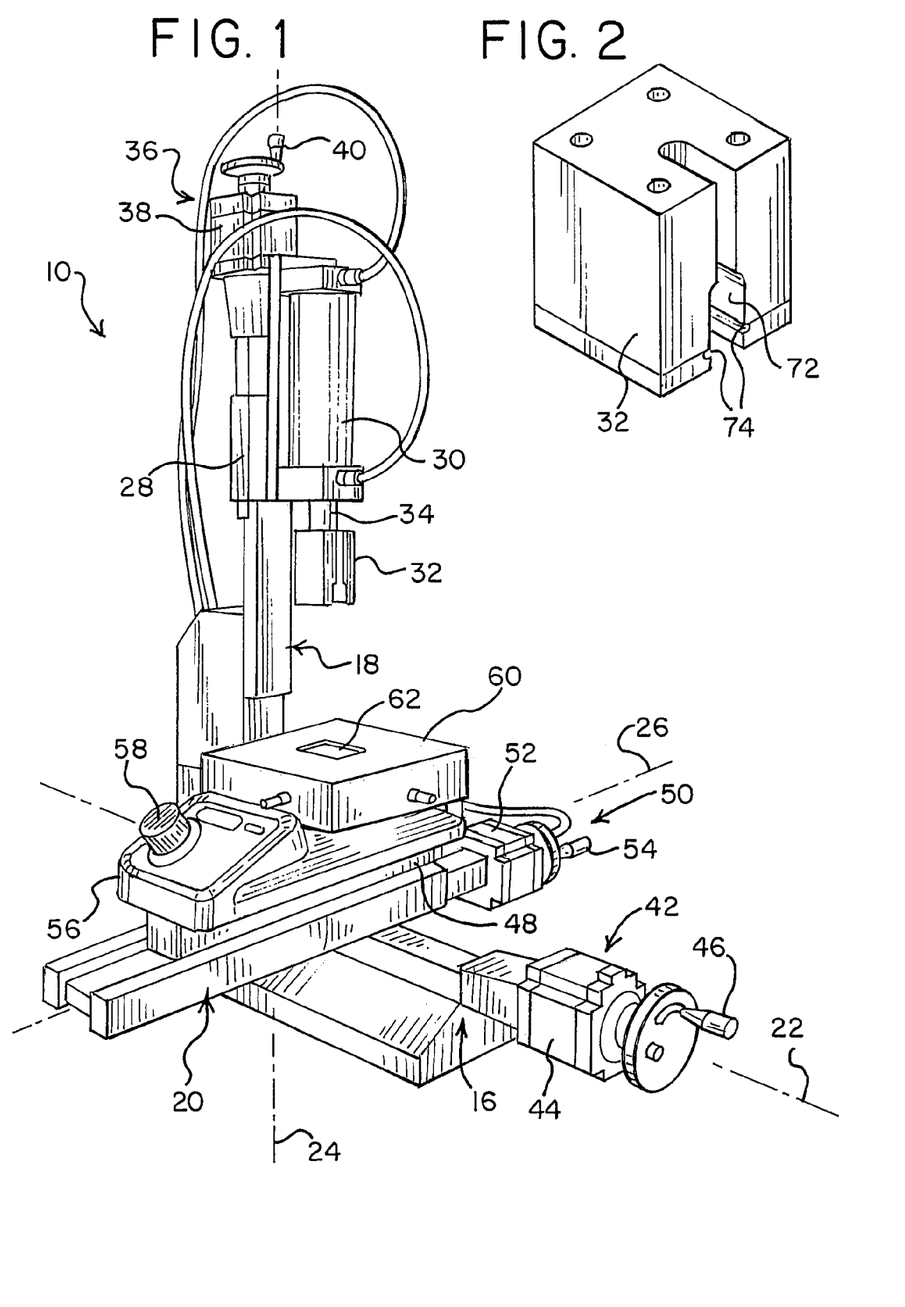
FIG. 1 is a perspective view of three-axis apparatus embodying the present subject matter with fixtures in a preferably spaced apart, loading position.
FIG. 2 is a perspective view of a fixture for holding a member or component that is to be heat or melt bonded or welded to a film or foil.
Figures 5, 6:
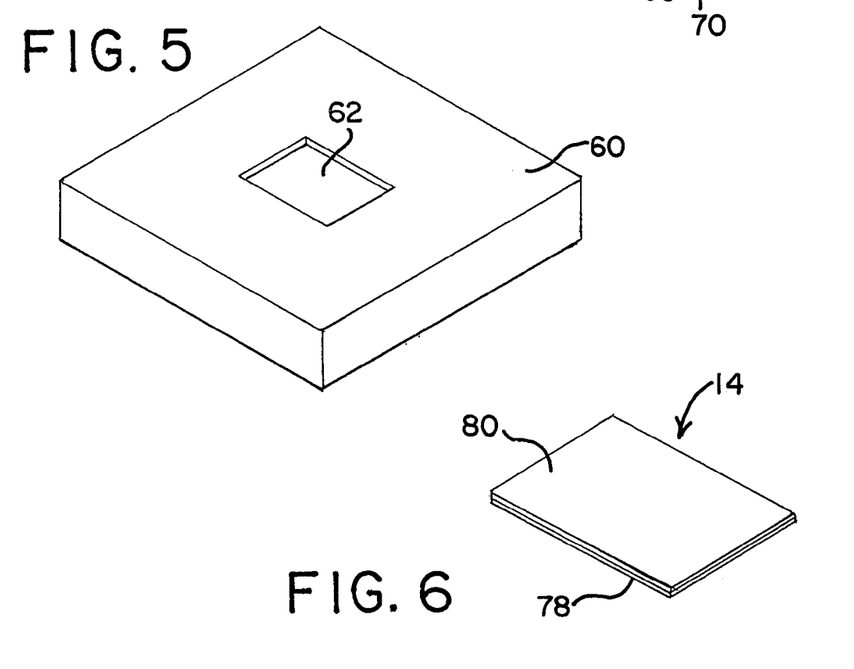
FIG. 5 is a perspective view of a fixture for supporting a film or foil during heat bonding or welding to a member or component.
FIG. 6 is a perspective view of a film or foil employed in one example of the present subject matter.

FIG. 1 is a perspective view of three axis apparatus 10 for hermetically bonding a member or component 12 (FIG. 3) to a sealing member such as a film or foil 14 (FIG. 6). As shown in FIG. 1, the apparatus is in a loading position in which the member or component and film or foil may be secured or mounted to the appropriate fixture. As used herein the terms "foil" and "film" are used interchangeably and no distinction is intended unless expressly stated. Similarly, "member" and "component" are also used interchangeably. "Heat weldable" and "melt bondable" are also used interchangeably and no distinction is intended. The apparatus 10 includes three support arms or frames 16, 18 and 20, each located and extending along one of three respective intersecting work axes, 22, 24 and 26. Axes 22, 24 and 26 are preferably orthogonal or transverse to one another, extending at right angles (laterally) to one another as in coordinate X, Y and Z axes. Each support arm is configured to mount a work member, fixture or another support arm in a linearly movable manner along the axis of such arm.

As illustrated, horizontal support arm 16 also forms the base for the overall apparatus 10, allowing it to rest on a work table or other support surface (not shown). Vertical support arm 18 is fixed to and extends upwardly from one end of horizontal support arm 16. Horizontal support arm 20 is mounted on the arm 16 and extends laterally with respect to arm 16 and arm 18, and is movable linearly along the axis of support arm 16.

In the illustrated embodiment at least one and preferably two or three of the support arms include individual drives or drive assemblies for moving the work member, arm or fixture mounted on such support arm along the respective axis of such arm. The drive(s) may be manual and/or automated and operable through such mechanism as may be desired, such as a lead screw, gear train, linkage, pneumatic or hydraulic cylinder, solenoid or other mechanism. Referring specifically to FIG. 1, vertical support arm 18 includes a movable carriage 28 that is movable axially (linearly) along the support arm and mounts a pneumatic piston/cylinder device 30 having an extendible and retractable shaft 34. Fixture 32, which is configured for holding the member 12 during the bonding operation, is attached to the end of shaft 34.

A drive or drive assembly, generally designated 36, is provided for moving the carriage 28 axially along the vertical support arm 18. The drive 36 may include a motor, such as a stepper motor 38, which is particularly suited for precise, repeatable computer controlled positioning of the carriage, and/or a manual actuator such as crank 40 for rotating a lead screw coupled to the carriage or other suitable drive mechanism. This arrangement allows manual and/or automatic positioning of the carriage 28 and, optionally, the manual actuator may be used for gross position changes and the stepper motor may be used for smaller or more incremental position changes or adjustments.

Horizontal support arm 20 is mounted for axial movement along support arm 16. As describe above, the mechanism for moving the support arm 20 may be of any suitable configuration such as lead screw or the like for moving the support arm along the axis 22 of support arm 16. The horizontal support arm 16 also includes an associated drive or drive assembly 42 for rotating a lead screw or otherwise moving the support arm 20 along support arm 16. The drive 42 may be essentially as described above with respect to drive 36 and include a motor, such stepper motor 44, and/or a manual actuator such as crank 46.

Horizontal arm 20 movably mounts a carriage 48. The carriage 48 is mounted for movement along the axis 26 of support arm 20, such as by lead screw, gear train, or other suitable mechanism as described above relative to the other support arms. The horizontal arm 20 includes a drive assembly 50, also having generally similar configuration to those described earlier, and is illustrated with a motor, such as stepper motor 52 and manual actuator in the form of crank 54, for rotating a leading screw that engages with the carriage 48, or other suitable mechanism for moving carriage 48.

Carriage 48 of horizontal support arm 20 supports an optional laboratory heat source, such as hot plate 56 for heating the foil 14, as will be described in more detail below.

Although illustrated as a hot plate, the heat source may employ any suitable heating principle such as conductive, convective, inductive or radiant heating, for example. The illustrated hot plate includes a temperature controller, illustrated in the form of a manual temperature control rheostat 58, although the temperature control could be automated and computer controlled if desired. The hot plate 56 supports a fixture in the form of a heat conductive cap or die plate 60 that has foil recess 62 for holding foil 14 in specific location.

With the above three-axis arrangement, the relative positioning of the member fixture 32 and a foil fixture (cap 60) for melt bonding (or welding) the member and foil together can be accurately controlled and repeated. Preferably, the drive assemblies 36, 42 and 54, and optionally also the pneumatic cylinder 30 and/or hot plate 56, are computer or software controlled (such as by MATLAB software from MathWorks of Natick, Ma. USA) for repeated and accurate control of not only relative positioning but also sealing temperature of the foil and stroke length and pressure applied by the cylinder.

Figure 3:
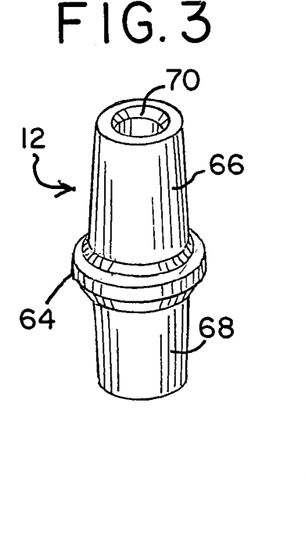
FIG. 3 is a perspective view of a member or component that is to be heat bonded or welded to a film or foil in one example of the present subject matter.
Figure 4:
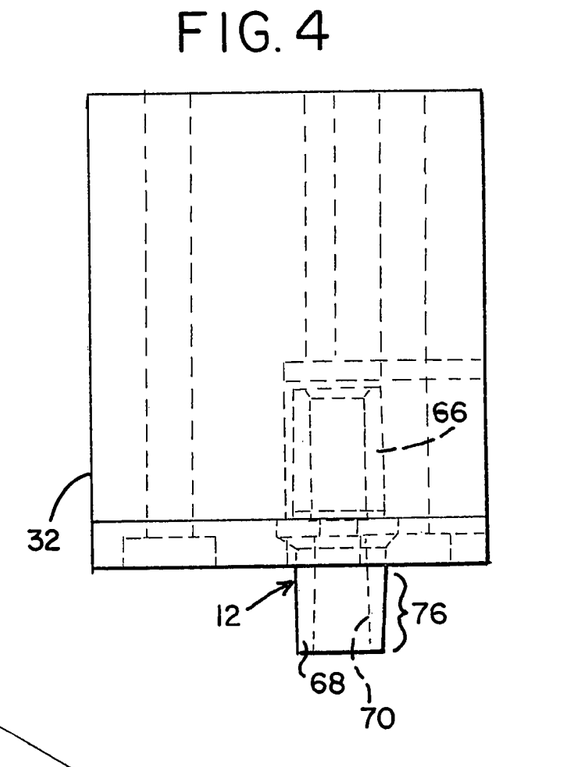
FIG. 4 is a side view of the fixture of FIG. 2 with the member or component of FIG. 3 located in a receiving or mounting slot in the fixture.

FIGS. 2-4 illustrate the member 12 and the fixture 32 in which it is mounted during bonding to the foil 14. The member is best seen in FIG. 3. The member 12 may actually be of any desired shape and is constrained only by the system or circuit in which it is intended to be used. As shown, the member is injection molded of rigid thermoplastic material, such as polysulfone, with a generally elongated cylindrical shape with a raised or radially enlarged annular positioning flange 64 and slightly tapered opposed cylindrical extensions 66 and 68. The member is hollow and has a bore or lumen 70 extending fully through the member as best seen in dashed lines in FIG. 4.

The component or member may be made entirely of any suitable moldable and heat bondable thermoplastic material and at least the portion bonded to the foil is preferably thermoplastic material. Preferably the melt temperature of the material is higher than sterilizing temperature so that the process of heat welding or bonding raises the temperature of the foil 14 and the contacting portion of the member 12 above sterilizing temperature for destroying or inactivating bacteria and other microorganisms. This is explained more fully in the applications incorporated by reference above. One material that meets these qualifications is polysulfone material, such as 1000 grade Udel brand polysulfone from Solvay Plastics of Brussels, Belgium, which has a melt temperature of about 329-385 degrees C. Sterilizing temperature is typically about 230 degrees C., and heating time may be several seconds, such as 5 or 6 or less, although heating time may vary inversely with temperature (the higher the temperature, the shorter the heating time required). Polysulfone appears to be well suited for sterile connection applications, is bondable to polyvinylchloride and the apparatus and methods described herein may be used to test, characterize and/or evaluate polysulfone as well as other potential materials for sterile connection applications.

FIG. 2 shows the fixture 32 into which the member 12 is temporarily mounted or positioned for bonding. The fixture may be of any suitable rigid plastic, metallic or other material. As see in FIG. 2, a slot or recess 72 is provided in the fixture for receiving the member 12. The slot is of width sufficient to receive the member 12 and the slot has opposed location grooves 74 for receiving the raised annular flange 64 of the member such that an end portion of one of the extensions 66, 68 extends beyond the fixture sufficiently that the end of the extension can be pressed into contact with the foil 14 during bonding. The tolerances between the location grooves 74 and flange 64 are sufficiently close that substantially the same positioning between fixture and member is repeatable as between sequential bonding operations. Preferably the width of the grooves 74 tapers slightly to frictionally retain the component or member securely within the fixture 32 during the heat welding or bonding process.

FIG. 4 is a side view of the fixture 32, with a member located in the receiving slot 72 for bonding to a film or foil 14. As can be seen there, an end portion 76 of one of the extensions 66, 68 extends below the lower surface of the fixture.

FIGS. 5 and 6 show a fixture for foil 14, which fixture is in the form of the cap or die plate 60. Turning first to the foil 14, it preferably includes a metallic layer 78, such as aluminum or other suitable metallic material, (preferably a material having bacteriostatic properties, as described in one or more of the prior applications incorporated by reference herein), and a layer 80 of thermoplastic material, such as but not limited to polysulfone. The film or foil may be acquired commercially or fabricated by melting polysulfone or other thermoplastic film or films of other material candidates directly onto the metallic layer. For example, for the illustrated example, a die cut piece (e.g., 2.5 cm×1.25 cm) of thin aluminum sheet or foil may be heated to about 500 degrees C., and a piece of polysulfone of similar size placed on top of the heated aluminum. The polysulfone melts quickly to the surface of the aluminum, adhering thereto. The laminated foil is then removed from the heat source (e.g., a hot plate), and compressed between cooling plates, such as steel surfaces, for cooling and for compressing to help it retain a flat shape. The metal and thermoplastic (e.g., aluminum and polysulfone) layers may be of any suitable thickness, such as from about 0.025 to about 0.075 mm (0.001-0.003 inches) or greater. The color of the polysulfone changes from clear to yellow if it is allowed to continue heating on a hot plate, and during manual fabrication the color change is preferably noted before it is used in further processing to confirm that the polysulfone is adhered to the aluminum film. In large scale production where processes are more controlled, color change may not occur.

Figures 7, 8, 9:
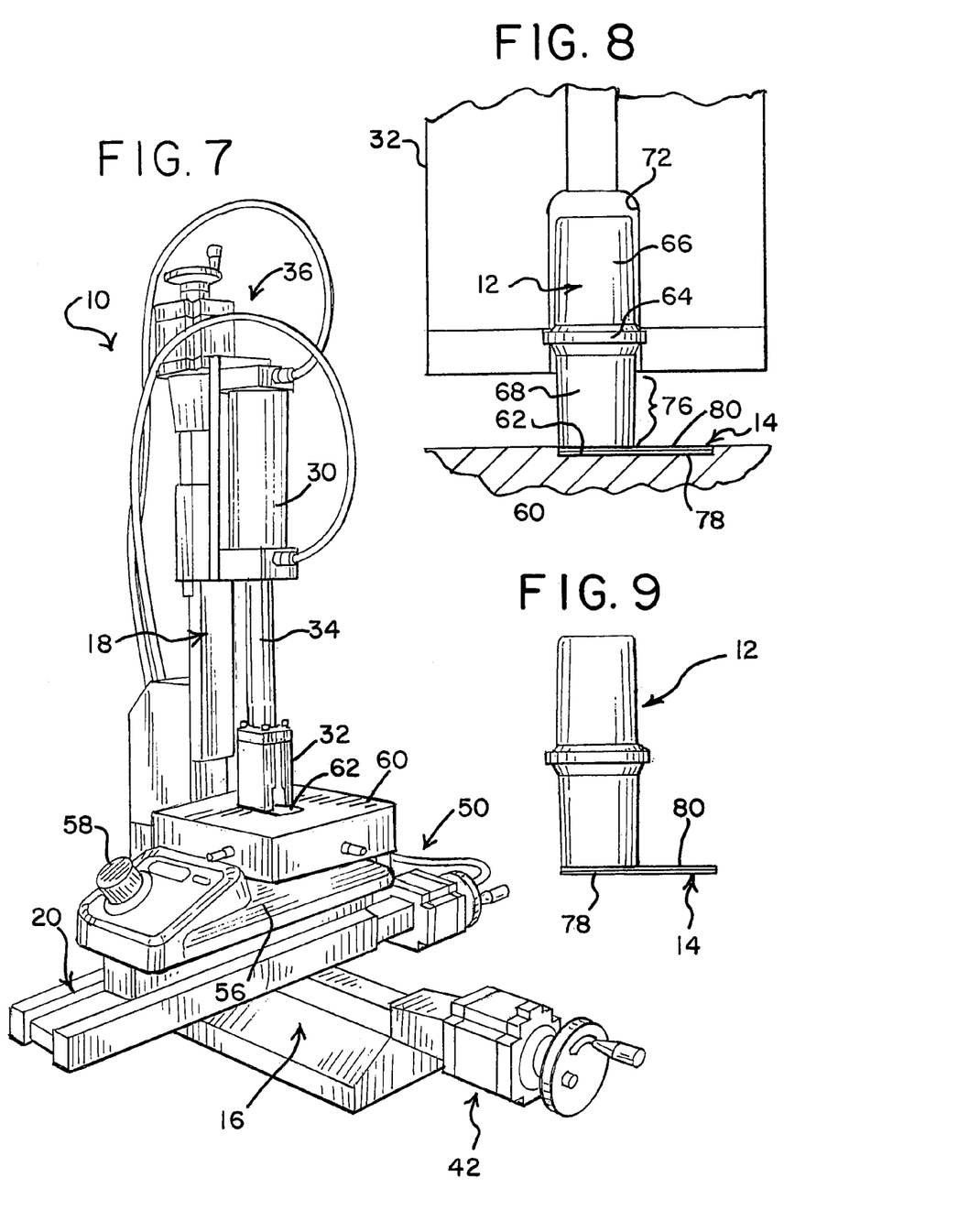
FIG. 7 is a perspective view of the apparatus in FIG. 1 with the fixtures in a bonding or welding position, in which the member and foil are in contact for the formation of a hermetic seal therebetween.
FIG. 8 is an fragmentary elevational view of the apparatus of FIG. 7, showing the member or component being pressed against a foil or film during the formation of a bond therebetween.
FIG. 9 is a side view of a member or component bonded to a film or foil.

The cap or die plate 60 is preferably of heat conductive metallic material, such as aluminum. It may be of any suitable size or shape, and is shown in FIGS. 1, 5 and 7 as a generally solid rectangular block of aluminum, with a foil positioning station, such as recess 62 on the upper surface. The recess closely conforms to the size and shape of the foil 14 to maintain it in the desired position during bonding. The cap or die plate 60 is secured relative to the heat source to directly conduct heat from the heat source to heat the film or foil 14. As illustrated, the cap rests on the hot plate 56. The same cap or die plate may also be used for melting and laminating the polysulfone to the aluminum layer, as described above, if desired.

Turning now to the method of use, FIG. 1 shows the apparatus 10 in which the member fixture 32 and the foil fixture, cap or die plate 60, are located in a loading position where they are relatively located to allow the member 12 to be inserted into slot 72 and foil 14 to be placed in the recess 62 (with thermoplastic layer facing upwardly). The member and foil (and associated fixtures) are preferably spaced apart in the loading position, but that is preferred and not required. The heat source (e.g., hot plate) may be set for the desired temperature for making, characterizing or testing the bond between member and foil, for example between 150-550 degrees C., and the cap or die plate allowed to come up to approximately the temperature of the hot plate.

The apparatus 10 is then actuated, manually and/or automatically via computer control, to move the carriages 28 and 48 and support arm 20 to the desired bonding position along the respective support arm on which it is mounted, where the foil 14 and member 12 are in the desired vertical alignment. The pneumatic cylinder 30, or other pushing apparatus, is then energized to extend the shaft 34 and force the exposed end of member 12 against the polysulfone layer 80 of the foil 14 as illustrated in FIG. 8. This may be referred to as the bonding or welding position. They are held in that position until the polysulfone layer of the film and the end surface of the member are sufficiently melted by the elevated heat of the cap or die plate to melt weld (bond) together, preferably forming a hermetic seal therebetween. Alternatively, or supplementally, the force alone may be sufficient to generate enough heat to cause bonding of the member and foil even in the absence of a separate heat source such as hot plate 56.

The air pressure in the pneumatic cylinder may be selected as desired to apply the desired force between the member and foil in the bonding position. Any desired pressure may be selected, and but it is contemplated that the pressure may be selected in a range of about 5 to 20 PSI of air pressure in the illustrated pneumatic cylinder 30, which has a bore diameter of about 1.125 inches (28 mm). Also, to enhance contact and melt welding/bonding between the member 12 and the foil 14, the position of the air cylinder or stroke length of the shaft 34 is preferably selected so that the lowermost surface of the member 12 is pressed downwardly to a position that is slightly below the upper surface of the foil 14 (such as, for example, about 0.1-0.5 mm or more, or about 0.25 mm, below the upper surface). This results in a slight compression or collapse of the heated thermoplastic material at the end of the member contacting the foil. For example, depending in part on the above-described positioning the thermoplastic material may collapse or be compressed between about 0.025 mm and about 2.5 mm (0.001 to 0.1 inches), and preferably is compressed about 0.76 mm (0.03 inches).

The apparatus is held in the bonding position for a limited amount of time as may be selected for manufacture or for testing purposes, such as about 0.5-2 seconds or more, such as up to about 5 or 6 seconds. The apparatus can then be returned to the initial or loading position, where the fixture 32 and cap 60 are spaced sufficiently to allow the bonded member and foil assembly to be removed from fixture 32.

The welded or bonded assembly of member 12 and foil 14 is shown for purposes of illustration in FIG. 9. The apparatus and method described herein may be used for manufacture or for testing, research and design purposes, with various conditions, such as contact force, temperature, contact time, amount of compression and materials varied to assess the process and/or the integrity of the resulting bond. Also, the apparatus 10 may be used to produce bonded assemblies for experimental or commercial use in products. For example, the bonded member 12 and foil 14 may be attached (before or after bonding) to a fluid flow assembly or circuit, as desired, such as at the end of a fluid flow conduit, and subsequently sterilized. Such a fluid flow circuit or assembly may then be attached in a sterile manner to another fluid flow circuit or assembly having a similar member and foil assembly as described in the above applications incorporated by reference. Without repeating the fuller description in the prior applications, to join such circuits, the foil (i.e. sealing member) of each fluid flow circuit is placed in face to face contact and heated until the member attached to each is sufficiently molten to form a melt bond or weld. The foils are then pulled from between the members as the members are simultaneously pressed together, such that a meld bond or weld immediately forms between the members as the foils are pulled from between them.

Examples

Without limiting any of the foregoing, the subject matter described herein may be found in one or more apparatus methods or assemblies. For example in a first configuration of the present subject matter, apparatus is provided for bonding a thermoplastic portion of a component or member to a film or foil having a surface heat weldable to the thermoplastic portion. Such apparatus may include a first fixture for holding the member; a second fixture for holding the foil; a first drive for moving at least one of the fixtures in a first direction between a loading position wherein the fixtures are spaced sufficiently to hold a member and foil in an unbonded relationship and a bonding position wherein the fixtures are more closely spaced to hold a member and foil in contacting relationship; a second drive for moving at least one of the fixtures in a second direction lateral to the first direction, and a third drive for moving at least one of the fixtures in a third direction generally transverse to the first and second directions.

A second configuration of the present subject matter includes the above apparatus including a control system configured for operating the first, second and third drives for moving the fixtures to a bonding position in which the fixtures are relatively positioned such that a member portion and foil are placed in contact.

A third configuration of the present subject matter includes apparatus in accordance with the first or second configurations in which the first, second and third directions that are orthogonal.

A fourth configuration of the present subject matter includes apparatus in accordance with any one of configurations 1-3 in which the first drive is operable to move the fixtures to exert a compressive force between the member and foil.

A fifth configuration of the present subject matter includes apparatus in accordance with any one of configurations 1-4 in which the member portion has a melt temperature and the apparatus comprises a heat source configured to heat the foil.

A sixth configuration of the present subject matter includes apparatus in accordance with any one of configurations 1-5 in which the control system is configured to hold the fixtures in the bonding position for a selected time period.

A seventh configuration of the present subject matter includes apparatus in accordance with any one of configurations 1-6 including a foil having a metal layer and a thermoplastic layer.

An eighth configuration of the present subject matter includes apparatus in accordance with apparatus in accordance with any one of configurations 1-4 and 6-7 in which sufficient pressure is exerted between the member and foil in the bonding position to cause bonding the thermoplastic portion and foil in the absence of a separate heat source.

A ninth configuration of the present subject matter includes apparatus in accordance with any one of configurations 1-7 in which the apparatus comprises a heat source configured to heat the foil to a temperature above the melt temperature of the thermoplastic portion.

A tenth configuration of the present subject matter includes apparatus in accordance with configuration 9 in which heat source is configured to heat the foil by direct conductive heating, inductive heating, convective heating and/or radiant heating.

An eleventh configuration of the present subject matter includes apparatus in accordance with any one of configurations 1-10 in which the apparatus is configured to cause the thermoplastic portion to compress or collapse a selected distance in bonding to the foil.

A twelfth configuration of the present subject matter includes apparatus in accordance with any one of configurations 1-11 including a member having a thermoplastic portion comprising polysulfone material or other material compatible with polysulfone for bonding purposes and the foil surface includes a layer of polysulfone material or other material compatible with polysulfone for bonding purposes.

A thirteenth configuration of the present subject matter includes apparatus in accordance with any one of configurations 1-12 in which the first fixture is configured to hold the member in a predetermined position.

A fourteenth configuration of the present subject matter includes apparatus in accordance with any one of configurations 1-13 in which the first fixture includes a keyed recess configured to hold a member in only one position.

A fifteenth configuration of the present subject matter includes apparatus in accordance with any one of configurations 1-14 in which the foil includes a layer of metal and a layer of polysulfone material.

An sixteenth configuration of the present subject matter includes apparatus in accordance with any one of configurations 1-15 including a control system configured for repeatedly operating the first, second and third drives to move the fixtures between a spaced apart loading position in which member and foil can be loaded into or unloaded from the fixtures and a bonding position in which the fixtures are relatively positioned such that a member portion and foil are placed in contact to bond them together.

A seventeenth configuration of the present subject matter includes apparatus in accordance with any one of configurations 1-16 in which the fixtures are configured such that the member and foil are spaced apart in the loading position.

An eighteenth configuration of the present subject matter includes apparatus in accordance with any one of configurations 1-17 in which the apparatus includes a heat source having a heating element for direct conductive heating of the foil.

A nineteenth configuration of the present subject matter includes apparatus in accordance with any one of configurations 1-18 including a foil that includes an aluminum layer having a thickness greater than or equal to about 0.001 inches (0.0254 mm) and a polysulfone layer having a thickness greater than or equal to about 0.001 inches (0.0254 mm).

A twentieth configuration of the present subject matter includes apparatus in accordance with any one of configurations 1-19 wherein in the bonding position, the first and second fixtures are located such that the thermoplastic portion of the member is compressed in an amount between about 0.001 and 0.1 inches (0.0254-2.54 mm)—for example, about 0.03 inches (0.76 mm).

A twenty-first configuration of the present subject matter includes apparatus in accordance with any one of configurations 1-20 including a control system configured for operating the first, second and third drives for moving the fixtures to a bonding position in which the fixtures are relatively positioned such that a member portion and foil are placed in contact, the control system being further configured to allow user selection and change of the bonding position, the period of time in the bonding position and the force between the member portion and the foil.

A twenty-second configuration of the present subject matter includes apparatus in accordance with any one of configurations 1-21 in which each drive includes a stepper motor.

A first method in accordance with the present subject matter includes bonding a member including a thermoplastic portion to a foil having a surface heat weldable to the member portion, which method includes employing any of the apparatus in accordance with any one of configurations 1-22.

A second method of the present subject matter is for bonding a thermoplastic portion of a member to a foil having a surface heat weldable to the member portion, which method includes: mounting such a member on a first fixture; mounting the foil on a second fixture; the fixtures being relatively movable in three directions, a first direction of movement toward and away from one another, a second direction generally lateral to the first direction and a third direction generally lateral to the first and second directions, the method further including heating the foil; and moving at least one of the fixtures in the first, second and/or third directions between a loading position wherein the fixtures are spaced sufficiently to hold a member and foil in an unbonded relationship and a bonding position wherein the fixtures are more closely spaced to hold a member and foil in contacting relationship until the thermoplastic member portion and foil surface bond together.

A third method of the present subject matter includes a method in accordance with the second method in which the first, second and third directions are orthogonal.

A fourth method of the present subject matter includes a method in accordance with any one of methods 2-3 including exerting a compressive force between the member and foil.

A fifth method of the present subject matter includes a method in accordance with any one of methods 2-4 including heating the foil to a temperature at or above the melt temperature of the thermoplastic portion of the member.

A sixth method of the present subject matter includes a method in accordance with any one of methods 2-5 including holding the fixtures in the bonding position for a selected time period.

A seventh method of the present subject matter includes a method in accordance with any one of methods 2-6 in which the foil has a metal layer and a thermoplastic layer.

An eighth method of the present subject matter includes a method in accordance with any one of methods 2-7 in which sufficient pressure is exerted between the member and foil in the bonding position to cause bonding the thermoplastic portion and foil in the absence of a separate heat source.

A ninth method of the present subject matter includes a method in accordance with any one of methods 2-8 in which the method comprises heating the foil with a heat source configured to heat the foil to a temperature above the melt temperature of the thermoplastic portion.

A tenth method of the present subject matter includes a method in accordance with any one of methods 2-9 in which the foil is heated by direct conductive heating, inductive heating, convective heating and/or radiant heating.

An eleventh method of the present subject matter includes a method in accordance with any one of methods 2-10 in which the thermoplastic portion compresses or collapses a selected distance in bonding to the foil.

A twelfth method of the present subject matter includes a method in accordance with any one of methods 2-11 in which the thermoplastic portion of the member comprises polysulfone material or other material compatible with polysulfone for bonding purposes and the foil surface includes a layer of polysulfone material or other material compatible with polysulfone for bonding purposes.

A thirteenth method of the present subject matter includes a method in accordance with any one of methods 2-12 including holding the member in a predetermined position with the first fixture.

A fourteenth method of the present subject matter includes a method in accordance with any one of methods 2-13 in which the member includes an orienting key and the method includes fitting the key configuration into a key recess in the first fixture.

A fifteenth method of the present subject matter includes a method in accordance with any one of methods 2-14 in which the foil includes a layer of metal and a layer of thermoplastic material.

A sixteenth method of the present subject matter includes a method in accordance with any one of methods 1-15 in which the foil includes a layer of polysulfone or a material heat weldable to polysulfone.

A seventeenth method of the present subject matter includes a method in accordance with any one of methods 2-16 including repeatedly operating the first, second and third drives to move the fixtures between a spaced apart loading position in which members and foil can be loaded into or unloaded from the fixtures and a bonding position in which the fixtures are relatively positioned such that a member portion and foil are placed in contact to bond them together.

An eighteenth method of the present subject matter includes a method in accordance with any one of methods 2-17 in which the heating includes direct conductive heating.

A nineteenth method of the present subject matter includes a method in accordance with any one of methods 2-18 in which the foil includes an aluminum layer having a thickness greater than or equal to about 0.001 inches (0.024 mm) and a polysulfone layer having a thickness greater than or equal to about 0.001 inches (0.0254 mm).

A twentieth method of the present subject matter includes a method in accordance with any one of methods 2-19 including compressing the member against the heated foil whereby the member collapses or compresses by an amount about between 0.001 and 0.1 inches (0.025-2.54 mm), for example about 0.003 inches (0.075 mm).

In another aspect of this subject matter, a first fluid flow system assembly configuration is provided including (a) a flow member having a lumen and a terminal portion comprising polysulfone material and (b) a sealing member comprising a foil including a layer comprising polysulfone material and a layer comprising metal, wherein the layer comprising polysulfone and portion comprising polysulfone material are melt bonded together to form a hermetic seal therebetween.

A second configuration of a fluid flow system assembly includes the above assembly wherein the metal comprises aluminum.

A third configuration of a fluid flow system assembly includes the first or second flow system assembly configuration wherein the foil comprises a layer of polysulfone material and a layer of aluminum.

A fourth configuration of a fluid flow system assembly includes the first, second or third flow system assembly configuration in which the member is made substantially entirely of polysulfone material.

In another aspect of this subject matter, a sealing member comprises a foil including a thermoplastic layer comprising polysulfone material and a layer of metal, such as but not limited to aluminum.

In another configuration of a sealing member in accordance with the above aspect may have a thermoplastic layer, having a thickness greater than or equal to about 0.001 inches (0.024 mm) and a layer of metal greater than or equal to about 0.001 inches (0.024 mm).

The invention claimed is:

1. A method for bonding a thermoplastic portion of a fluid flow conduit component to an individual and discrete foil having a surface heat weldable to the fluid flow conduit component, such method including:

mounting such a fluid flow conduit component on a first fixture, the fluid flow conduit component including a fluid flow lumen extending therethrough and having an end opening in the thermoplastic portion, the fluid flow conduit component and the first fixture being configured for securing the fluid flow conduit component in a fixed position on the first fixture;

mounting the foil on a second fixture, the foil and second fixture being configured for securing the foil in a fixed position on the second fixture;

the first and second fixtures being relatively movable in three directions, a first direction of movement toward and away from one another, a second direction generally lateral to the first direction and a third direction generally lateral to the first and second directions;

the method further including maintaining the second fixture in a fixed position;

heating the second fixture to cause conductive heating of the foil; and moving the first fixture in the first direction between a loading position wherein the fixtures are spaced sufficiently to hold the fluid flow conduit component and foil in an unbonded relationship and a bonding position wherein the fixtures are more closely spaced to hold the fluid flow conduit component and foil in contacting relationship until the thermoplastic portion of the fluid flow conduit component and foil surface bond together sealing the open end of the of the lumen, the movement of the fixtures exerting a compressive force between the fluid flow conduit component and the foil and causing selected compression of the fluid flow conduit component in the bonding position and, after bonding, moving the first fixture toward the loading position while retaining the fluid flow conduit component in a mounted position on the first fixture.

2. The method of claim 1 including heating the foil to a temperature above the melt temperature of the thermoplastic portion of the fluid flow conduit component.

3. The method of claim 1 including holding the fixtures in the bonding position for a selected time period.

4. The method of 1 in which foil includes a metal layer having a thickness greater than or equal to about 0.001 inches (0.0254 mm) and a polysulfone layer having a thickness greater than or equal to about 0.001 inches (0.0254 mm).

5. The method of claim 1, whereby the fluid flow conduit component is compressed by an amount between about 0.001 and 0.1 inches (0.025-2.54 mm).

6. The method of claim 1 including changing the bonding position, the period of time in the bonding position, the amount of compression of the fluid flow conduit component or the force between the fluid flow conduit component portion and the foil.

7. The method of claim 1 in which the includes a metal layer and a thermoplastic layer.

8. The method of claim 1 including heating the to a temperature above the melt temperature of the thermoplastic portion.

9. The method of claim 1 in which the thermoplastic portion of the fluid flow conduit component comprises polysulfone material and the foil has a surface contacted by the fluid flow conduit component, which surface is defined by a layer of polysulfone material.

10. The method of claim 1 in which the first fixture includes a recess for receiving the fluid flow conduit component, the recess being sized to frictionally retain the fluid flow conduit component in the fixed position during bonding and the second fixture includes a recess for receiving the foil.

11. The method of claim 1 in which the foil includes a layer of polysulfone or a material heat weldable to polysulfone.

12. The method of claim 1 including repeatedly moving the first fixtures between a loading position in which the fluid flow conduit component and foil can be loaded into or unloaded from the fixtures and a bonding position in which the fixtures are relatively positioned such that the fluid flow conduit component portion and foil are in contact to bond them together.

13. The method of claim 1 in which the fluid flow conduit component is compressed about 0.03 inches (0.76 mm) in bonding.

\* \* \* \* \*